Sept. 21, 1954      J. B. GODSHALK      2,689,939

BATTERY TESTING APPARATUS

Filed Dec. 12, 1952      3 Sheets-Sheet 1

INVENTOR:
JAMES B. GODSHALK
BY Stone, Boyden & Mack,
ATTY'S

Sept. 21, 1954  J. B. GODSHALK  2,689,939
BATTERY TESTING APPARATUS
Filed Dec. 12, 1952  3 Sheets-Sheet 3

INVENTOR:
JAMES B. GODSHALK
BY:
Stone, Boyden & Mack
ATTY'S

Patented Sept. 21, 1954

2,689,939

UNITED STATES PATENT OFFICE 2,689,939

BATTERY TESTING APPARATUS

James B. Godshalk, West Pikeland Township, Chester County, Pa., assignor to Fox Products Company, Philadelphia, Pa., a corporation of Pennsylvania Application December 12, 1952, Serial No. 325,661

13 Claims. (Cl. 324—29.5)

This invention relates to battery testing apparatus and particularly to apparatus for testing multi-cell storage batteries by cell comparison.

It is now well accepted in the storage battery art that one of the best methods for determining the condition of a multi-cell storage battery is by comparing the voltages of the individual cells of the battery, either by an "open circuit" test or while the battery is being discharged, to determine if there exists between any of the cells a voltage differential greater than a predetermined allowable maximum. It has been thoroughly demonstrated that one of the first dependable signs of failure of a battery is the occurrence of excessive cell voltage misalignment. Thus, for example, it has been shown that a voltage difference between any two cells of a conventional automotive storage battery on the order of .04–.06 volt on open circuit test, or of .07–.1 volt while the battery is discharging at a rate of 150–200 amperes, is indicative of a bad battery.

A number of devices have been employed commercially for performing cell voltage comparison tests on the conventional 3-cell 6-volt automotive storage batteries. Originally, the voltage comparison was made by connecting a single voltmeter sequentially across the cells of the battery, noting the reading for each cell, and then comparing the readings. Also, devices have been employed which include a separate voltmeter for each cell, the voltmeters being connected simultaneously to their respective cells, and the readings of the meters noted and compared. More recently, testers have been devised which automatically compare the cell voltages, so as to eliminate the need for mental comparison of separate readings. Such automatic testers are disclosed, for example, in Patent 2,621,231, issued December 9, 1952, to James B. Godshalk and Lewis A. Medlar.

While most automotive storage batteries employed in the past have been 3-cell, 6-volt batteries, the present trend in the automotive industry is to employ 12-volt batteries having six cells. Thus, at the present time, a garage, service station, parking lot, or the like must be equipped to quickly and accurately test both 3-cell, 6-volt batteries and 6-cell, 12-volt batteries. And, though the proportion of 12-volt batteries will increase, it appears that there will, at least for years to come, still be a large quantity of 6-volt batteries in use.

Since the 12-volt batteries have six cells, rather than the usual three, the problem of making a cell voltage comparison test has become more difficult. The increased number of cells makes it practically impossible, for example, to use a tester which will automatically and simultaneously compare all of the cells. While, as described in the aforementioned patent, such a device can be readily adapted for 3-cell batteries, the connections to the cells become so complex in a similar device for 6-cell batteries that the ordinary garage mechanic or service station attendant could not be expected to cope with it. Similarly, in devices which require a separate voltage reading for each cell, the task becomes too complex when a 6-cell battery is tested, since the operator under most conditions cannot be expected to quickly note all of the required readings and make the necessary comparisons. Finally, where a testing device requiring connection in a given polarity sense is employed, the task of making the connections to each of the six cells in the proper polarity is obviously quite difficult for the garage mechanic or similar user to undertake.

An object of the present invention is to provide apparatus for testing either 6-volt, 3-cell storage batteries or 12-volt, 6-cell storage batteries without requiring the operator to make voltage comparisons.

Another object is to devise such an apparatus which will require only the simplest connections to the battery being tested, without regard to the relative polarity of connection.

A further object is to provide a relatively simple and inexpensive battery cell comparator useful for testing storage batteries of any number of cells and requiring only a minimum of technical skill on the part of the operator.

In general, I accomplish these objects by employing a differential electromagnetic device, such as a differential voltmeter, a differential relay, a saturable reactor having differential D. C. windings, or any similar device including two electromagnetic coils. One coil of the device is connected in a circuit provided with means for selectively connecting the coil across any desired cell of the battery to be tested. The other coil is connected in a second circuit including means for connecting that coil to the battery. The second circuit and its connector means may be such as to connect the coil included therein across an end cell of the battery, so as to use that cell as a reference cell, or it may be such as to connect that coil across any desired cell of the battery, or it may be such as to connect that coil across the entire battery, in which latter case the circuit is preferably such that the coil included therein responds to the average cell voltage of the battery, as described in my co-pending application, Serial Number 325,660, filed on even date herewith. Indicating means, such as the moving system, scale and pointer of the meter, or a signal system controlled by the relay, is provided to respond to the difference in electromagnetic effects of the two cells. Finally, I provide means for automatically maintaining the two coils in electromagnetic opposition, regardless of the manner in which the operator makes the individual cell connections.

In order that the invention may be understood in detail, reference is had to the accompanying drawings which form a part of this specification and wherein:

Fig. 1 is a schematic diagram of an embodiment of the invention employing a differential voltmeter and means for selectively connecting the two coils thereof each selectively across any desired cell of the battery;

Fig. 1ª is a plan view of a typical form of dial for the meter of the apparatus shown in Fig. 1;

Figure 1:
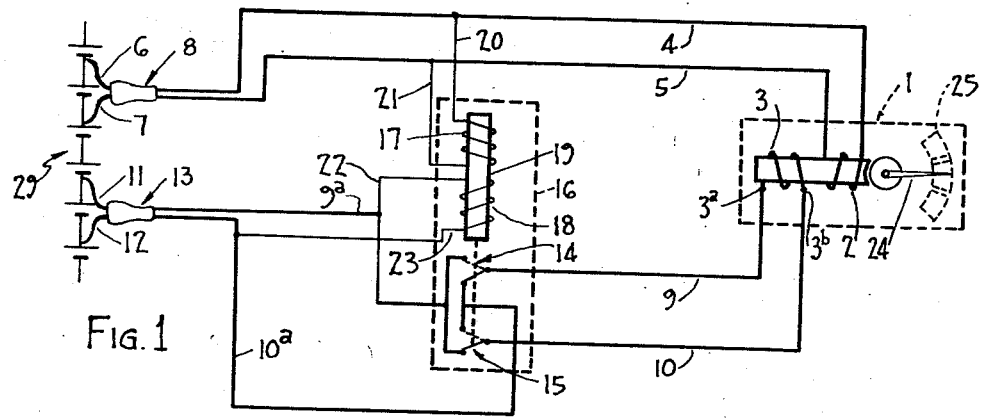

Referring now to the drawings in detail, Fig. 1 illustrates an embodiment of the invention comprising a differential voltmeter, means for selectively connecting the coils of the voltmeter selectively across different cells of the battery to be tested, and means for maintaining the two coils in electromagnetic opposition regardless of the relative polarity in which the operator makes the connections to the battery.

The differential voltmeter 1 includes coils 2 and 3 and any suitable means for moving the pointer of the meter across its scale in response to the difference in electromagnetic effects of the coils 2 and 3. The details of the meter construction form no part of the invention. The terminals of the coil 2 are connected to conductors 4 and 5, which are in turn respectively connected to the contact prongs 6 and 7 of a twin-pronged hand prod 8, so that the coil 2 is thus connected across the prongs of the prod. Similarly, the coil 3 has its terminals connected to conductors 9 and 10, which are respectively connected to the contact prongs 11 and 12 of a twin-pronged hand prod 13 through conductor portions 9ª and 10ª.

Interposed in conductors 9 and 10 are the contact sets 14 and 15, respectively, of a double pole double throw relay 16. The contact sets 14 and 15 are arranged as reversing contacts, as shown, so that when the two movable contacts are each actuated in one direction, the coil 3 is connected across the prongs 11 and 12 in one sense, but when the two movable contacts are actuated in the other direction, the coil 3 is connected across the prongs 11 and 12 in the opposite sense. In other words, when the relay is relaxed, the contact positions are such that terminal 3ª of the coil 3 is connected to prong 12 while terminal 3ᵇ is connected to prong 11, but upon actuation of the relay to the contact positions shown in dotted lines in Fig. 1, the connection of coil 3 is reversed, so that terminal 3ª is connected to prong 11 and terminal 3ᵇ to prong 12.

The relay 16 includes actuating windings 17 and 18 wound upon a common core 19 and having substantially equal numbers of turns. Winding 17 is connected by conductors 20 and 21 between conductors 4 and 5, in parallel with coil 2. Winding 18 is connected by conductors 22 and 23 between conductors 9ª and 10ª, so as to be in parallel with coil 3.

The windings 17 and 18 are so oriented that they aid each other electromagnetically when the relative directions of current flow in the circuit of coil 2, on the one hand, and the circuit of coil 3, on the other hand, considering the relay 16 to be relaxed, are such that coils 2 and 3 aid each other electromagnetically. As an example, consider that current flows from prong 7 to prong 6 through coil 2, and from prong 12 to prong 11 through coil 3, with the relay 16 relaxed as shown, and that coils 2 and 3 are so wound and connected as to oppose each other electromagnetically under such conditions. Then, the windings 17 and 18 are wound oppositely to each other on the core 19 and are connected as shown, so that they will oppose each other electromagnetically under the conditions just described, and the relay will not be actuated. If one only of the prods 8 and 13 should be connected in reverse polarity to that shown, the coils 2 and 3 would aid each other electromagnetically if the relay were not actuated, and the device 1 would not function as a differential meter. But, for such connection, the windings 17 and 18 will also aid each other electromagnetically, and the contacts of the relay 16 will be actuated to reverse the connection of coil 3, placing the coils 2 and 3 in electromagnetic opposition. Since the winding 18 is connected across conductors 9 and 10 at a point between the prod 13 and the contacts of the relay 16, the opposed relation of the windings 17 and 18 remains unchanged by actuation of the relay, and the relay will remain actuated so long as the prods remain connected to the battery. Thus, the relay 16 serves automatically to maintain the coils 2 and 3 of the differential voltmeter 1 in electromagnetic opposition regardless of the manner in which the prods 8 and 13 are connected to the battery.

The meter 1 is preferably of such construction that its indicating needle 24 is centered on the dial 25 when the meter is not actuated. The dial of the meter is preferably calibrated in the manner shown in Fig. 1ª, being provided with a central "good" zone 26, "doubtful" zones 27 at each end thereof, and "bad" zones 28 at the ends of the dial. The meter is so adjusted as to indicate in one of the bad zones when voltages impressed across the coils 2 and 3 differ by an amount greater than is the allowable cell voltage differential for the battery to be tested. Allowable voltage differentials cause the meter to read in the good zone, and voltage differentials not so abnormal as to definitely indicate a bad battery actuate the meter to one of the doubtful zones. The direction of movement of the indicating needle 24 will of course depend upon which of the coils 2 and 3 is connected to the source of larger voltage.

Figure 1A:
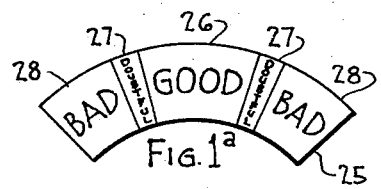

In operation, the hand prods 8 and 13 are connected across two different cells of the battery 29 to be tested, and the operator notes the position of the needle 24 of meter 1. If the meter reads in a bad zone, it is immediately known that the battery is bad and further comparison of the other cell voltages is unnecessary. If the meter reads in a good zone or a doubtful zone, the operation is continued, connecting the prods across different cells of the battery, either until all of the cells have been compared, or until a reading in a bad zone is obtained. The operator need not compare readings. It is only necessary to note, for each connection of the prods, whether a meter reading of "bad" or "doubtful" is obtained. Since the operator need give no attention at all to the question of polarity, and since the meter responds practically instantaneously to any voltage difference, the test can be made comparatively quickly.

Where it is desirable to employ both an open circuit test and a discharge test, the meter 1 may be provided with two scales similar to that illustrated in Fig. 1a, one being calibrated for open circuit testing and the other for discharge testing.

Figure 2:
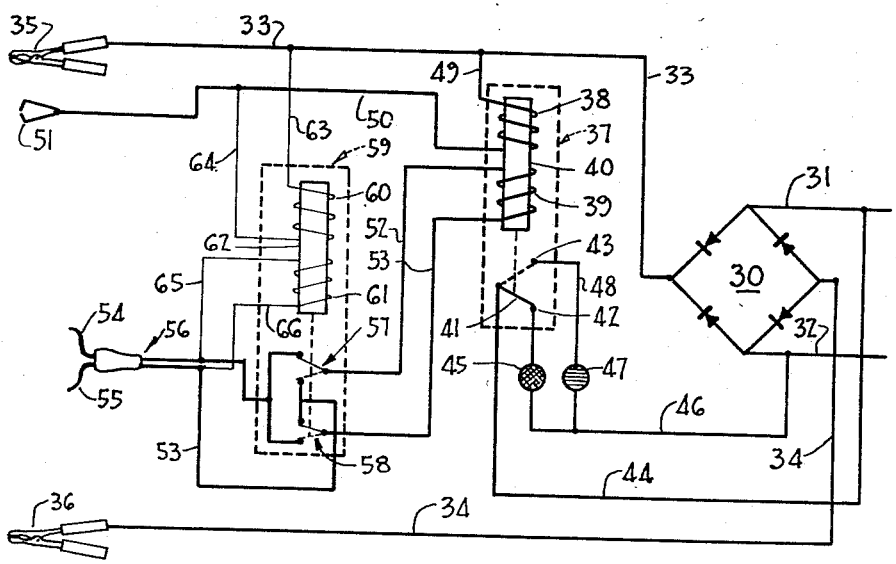
Fig. 2 is a schematic diagram of another embodiment of the invention including a battery cell comparator of the type described associated with a battery charger.

The embodiment of the invention illustrated in Fig. 2 is particularly adapted to use in combination with a battery charger, as shown. Here, the bridge rectifier 30 of a conventional charger includes input leads 31 and 32, and output leads 33 and 34. The output leads terminate in hand clamps 35 and 36, respectively, for connection to the terminals of the battery to be charged.

The tester comprises a differential relay 37 including coils 38 and 39 wound oppositely upon a common core 40. The relay 37 is of the single pole double throw type, its movable contact 41 engaging a stationary contact 42 when the relay is relaxed, and a stationary contact 43 when the relay is energized. The movable contact 41 is connected to the input lead 31 of the rectifier 30 by conductor 44. An incandescent lamp 45 of one color is connected between stationary contact 42 and the input lead 32 of the rectifier by conductor 46. An incandescent lamp 47 of a different color is connected by conductor 48 between stationary contact 43 and conductor 46. Thus, when the relay 37 is relaxed, lamp 45 is energized by alternating current from the input to the rectifier of the charger, but this lamp is extinguished and lamp 47 energized from the same source when the relay is energized.

The coil 38 of relay 37 is connected on the one hand to charging lead 33 by conductor 49, hence to connector clamp 35, and on the other hand to a conductor 50 terminating in a connector clamp 51 suitable for connection to a cell connector strap of the battery to be tested. Thus, when the charger is connected to a battery, clamp 35 being connected to one of the battery terminals, the coil 38 can be connected across an end cell of the battery by connecting clamp 51 to the cell connector strap of the battery nearest the terminal to which clamp 35 is connected.

The terminals of coil 39 of relay 37 are connected each to a different one of the conductors 52 and 53, these conductors being connected to prongs 54 and 55, respectively, of a twin-pronged hand prod 56. Thus, the coil 39 can be selectively connected across any desired cell of the battery by manipulation of the hand prod 56.

Interposed as reversing contacts in conductors 52 and 53 are the contact sets 57 and 58, respectively, of a double pole double throw relay 59. The relay 59 includes two actuating windings 60 and 61 wound upon a common core 62. Winding 60 is connected, by conductors 63 and 64, between the charging lead 33 and conductor 50, and is thus in parallel with coil 38 of relay 37. Winding 61 is connected, by conductors 65 and 66, between conductors 52 and 53, and thus is in parallel with coil 39 of relay 37. This connection is made at a point between the hand prod 56 and the contacts of relay 59.

The orientation of windings 60 and 61, Fig. 2, is precisely like that of windings 17 and 18, Fig. 1. Thus, the relay 59, Fig. 2, operates in the same manner as relay 16, Fig. 1, to maintain the coils 38 and 39 of relay 37 in electromagnetic opposition regardless of the manner in which the operator connects the apparatus to the battery.

In operation, the charger is connected to the battery by connecting the clamps 35 and 36 to the battery terminals. Connector 51 is then connected to the cell connector strap nearest the clamp 35, so placing coil 38 and winding 60 in parallel across an end cell of the battery. This end cell is used as a reference cell in the test. The hand prod 56 is then employed to connect the parallel combination of coil 39 and winding 61 sequentially across each of the other cells of the battery. At each step in this sequence of connections, the operator merely observes whether or not lamp 47 is energized.

The relay 37 is constructed to be actuated only by a differential electromagnetic effect of the coils 38 and 39 of a magnitude such as is produced by a cell voltage misalignment indicative of a bad battery, smaller differentials failing to actuate the relay. Thus, so long as the cell voltage differentials are in the allowable range, lamp 45 is continually energized. But, when an excessive cell voltage differential is encountered during the test, lamp 45 is extinguished and lamp 47 energized.

It will be obvious that, in the apparatus of Fig. 2, the relay 37 and its signal lamps may be replaced by a differential voltmeter, as in Fig. 1.

Figure 3:
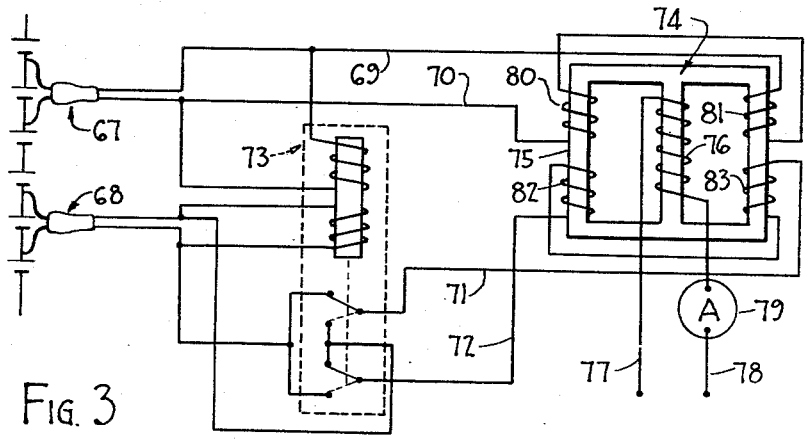
Fig. 3 is a schematic diagram of an apparatus similar to that of Fig. 1 but employing a saturable reactor as the differential electromagnetic device.

Further, the differential electromagnetic device employed may be a saturable reactor, as shown in Fig. 3. Here, for purposes of simplicity, hand prods 67 and 68, conductors 69 and 70 connected to prod 67, conductors 71 and 72 connected to prod 68, and two-coil reversing relay 73, all are arranged in the same manner as the corresponding components of the apparatus shown in Fig. 1. The differential voltmeter of that apparatus is, however, replaced in Fig. 3 by the saturable reactor 74. The saturable reactor 74 includes the usual iron core 75 upon the central leg of which is wound a coil 76 connected, by conductors 77 and 78, to a suitable source of alternating current, an ammeter 79 being interposed in one of the conductors 77 and 78 to indicate the alternating current flow.

Two of coils 80 and 81, each wound on a different one of the outer legs of the core 75, are connected in series between conductors 69 and 70, the series combination of these two coils thus being connected across the twin prongs of hand prod 67. Similarly, two coils 82 and 83, wound each on a different one of the outer legs of core 75, are connected in series between conductors 71 and 72, so that the series combination of these two coils is connected across the twin prongs of hand prod 68. Relay 73 functions to maintain coils 80 and 81 in electromagnetic opposition to coils 82 and 83, regardless of the manner in which the operator connects the prods 67 and 68 to the battery, the operation of relay 73 being precisely like that of relay 16, Fig. 1.

The sum of the turns of coils 80 and 81 equals the sum of the turns of coils 82 and 83. Thus, if the prods 67 and 68 are connected across cells of substantially equal voltage, coils 80—83 produce no net magnetomotive force, and the reading of ammeter 79 is not affected. But, if the prods 67 and 68 are connected across cells of substantially different voltage, the effect of one of the coil pairs 80, 81 or 82, 83 will predominate, and a net magnetomotive force results which saturates the iron core 75 to an extent depending upon the difference between the voltages of the cells to which the prods are connected. With its core partially saturated, the reactor presents a lower impedance to the alternating current voltage applied across conductors 77 and 78, and there will result an increase in the alternating current flow to which the meter 79 responds. Thus, the current variations to which the meter responds are proportional to the battery cell voltage differentials, and the meter can be calibrated in the manner previously described with reference to Figs. 1 and 1ª.

Figure 4:
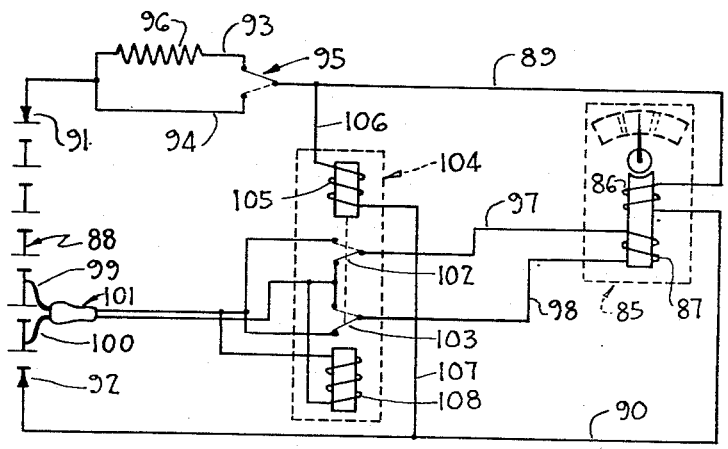
Fig. 4 is a schematic diagram illustrating my invention embodying an apparatus for sequentially comparing the battery cell voltages with the average cell voltage.

In all of the embodiments of the invention described thus far, battery cell voltages are compared directly. Fig. 4 illustrates a further embodiment in which a differential electromagnetic device is employed to compare the voltage of each cell of the battery with the average voltage of all of the battery cells. This embodiment employs the broad apparatus, and carries out the method, described and claimed in my copending application, Serial Number 325,660.

This apparatus includes a differential voltmeter 85 including coils 86 and 87. The coil 86 is connected across the entire battery 88 to be tested through a circuit comprising conductors 89 and 90 and battery terminal connector clamps 91 and 92. Interposed in one of the conductors 89 or 90 is a parallel branch circuit having arms 93 and 94 either of which can be placed in series with coil 86 by operation of a selector switch 95. The branches 93 and 94 are made of different resistance, as by including in arm 93 a resistance 96.

Coil 87 of the meter is connected by conductors 97 and 98 across the contact prongs 99 and 100 of a hand prod 101, so that this coil can be selectively connected to any desired cell of the battery by manipulation of the hand prod. Interposed as reversing contacts in this circuit are the contact sets 102 and 103 of a relay 104. One actuating winding 105 of the relay 104 is connected between conductors 89 and 90, and thus in parallel with meter coil 85, by conductors 106 and 107. The other winding 108 is connected between conductors 97 and 98, and thus across the contact prongs of prod 101, by conductors 109 and 110. The actuating windings 105 and 108 are so oriented as to aid each other electromagnetically whenever the coils 86 and 87 aid each other electromagnetically, and to oppose each other whenever the coils 86 and 87 are opposed with the relay contacts in relaxed position. Thus relay 104 serves to maintain the coils of the meter in electromagnetic opposition, operating as does relay 16 of Fig. 1, so relieving the operator of the necessity of giving any attention to the question of polarity.

In order that meter 85 may respond to the difference between average cell voltage and the actual voltage of the cell across which prod 101 is connected, the resistances of the coil circuits and the number of turns of the coils are made such that the ampere turns of coils 86 and 87 are substantially equal when those coils are connected respectively across an entire normal battery at its normal voltage and across a single normal cell thereof. The apparatus is intended for use in testing either 6-volt batteries or 12-volt batteries, thus necessitating the parallel branches 93 and 94 of different resistance. As an example of operable circuit values, coils 86 and 87 may have equal turns, coil 86 a resistance of 3r, coil 87 a resistance of r, and resistance 96 a resistance of 1.5r when the relay winding 105 has a resistance of 3r as described below.

Similarly, the windings 105 and 108 should substantially equally oppose each other when the apparatus is connected as shown. Otherwise, the voltage differential occurring when prod 101 is connected across a cell having a voltage different from the average cell voltage would tend to actuate the relay. Accordingly, so that the ampere-turns of the windings 105 and 108 will be substantially equal, the windings may have equal numbers of turns, winding 105 a resistance of 3r, and winding 108 of resistance of r.

The meter 85 may be calibrated with "good," "doubtful" and "bad" zones, in the general manner described with reference to Figs. 1 and 1ª, the precise manner in which such calibration is determined being described in the aforesaid copending application, Serial Number 325,660.

In operation, clamps 91 and 92 are connected to the terminals of the battery 88 to be tested, without regards to polarity. The operator then employs switch 95 to select one of the arms 93 and 94, depending upon whether a 12-volt or a 6-volt battery, respectively, is to be tested. Prod 101 is then connected sequentially across each cell of the battery, the operator watching the meter 85 to note whether a "bad" or "doubtful" reading is obtained for any one of the connections in the sequence.

It will be obvious that the differential relay 37, Fig. 2, or the saturable reactor 74, Fig. 3, can be substituted for the differential voltmeter of Fig. 4.

Figure 5:
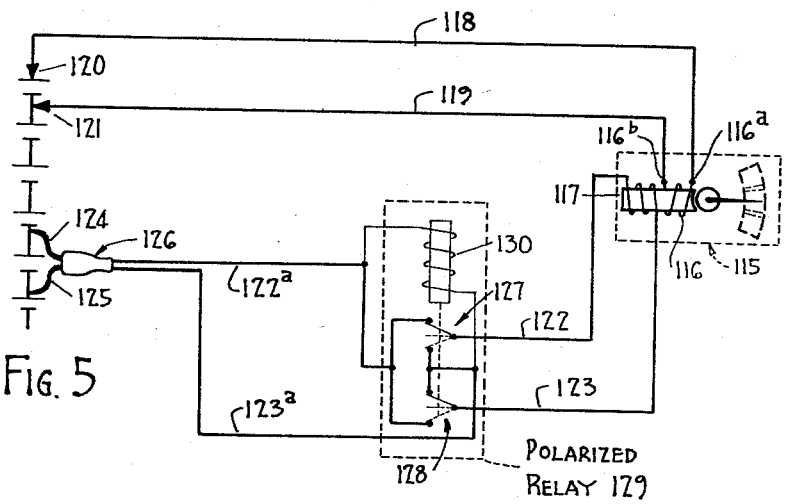
Fig. 5 is a schematic diagram illustrating another embodiment of my invention which employs a polarized relay for maintaining the coils of the differential electromagnetic device in opposition.

In Fig. 5, I have shown an embodiment of the invention employing a polarized relay in place of the two-coil reversing relay of Figs. 1-4. A differential voltmeter 115 having coils 116 and 117 is again employed. Coil 116 is connected to conductors 118 and 119 terminating respectively in a terminal clamp 120 and a clamp 121 for connection to a cell connector strap of the battery. In this embodiment, coil 116 must be connected across an end cell of the battery in a given polarity. Accordingly, clamp 120 is preferably marked in any suitable manner for identification either as a "positive" or a "negative" clamp for connection to the corresponding terminal of the battery. Clamp 121 is connected to the cell connector strap next adjacent to that terminal, and the coil 116 is thus placed across an end cell of the battery with terminals 116ª connected to a given pole of that cell, and terminals 116ᵇ to the opposite pole.

The terminals of the coil 117 are connected to conductors 122 and 123, hence across contact prongs 124 and 125 of hand prod 126. Interposed between the contact prongs 124 and 125 of the coil 117, are the contact sets 127 and 128 of a polarized relay 129. Actuating winding 130 of the relay is connected across conductors 122ª and 123ª, as shown, hence being connected across the prongs of the prod 126.

Relay 129 may be of any suitable conventional type in which the movable contact elements of contact sets 127 and 128 occupy a central position when the relay is relaxed but are thrown in one direction when the winding 130 is energized with one polarity, and in the opposite direction when the winding is energized with the other polarity. Coil 116 will have a predetermined polarity, since connectors 120 and 121 are connected to an end cell of the battery with predetermined polarity. Winding 130 is so oriented that contacts 127 and 128 are actuated to place coil 117 in electromagnetic opposition to coil 116 regardless of the manner in which prod 126 is connected across a cell of the battery. Assuming, for example, that coils 116 and 117 are wound oppositely on a common core, then the relay 129 is so constructed that winding 130 attracts the movable contacts of the relay to the positions shown in solid lines in Fig. 5 when the prod 126 is connected as shown, but repels such contacts to the positions shown in dotted lines when the connection of the prod is reversed. With the exception of the operation of the relay 129, the apparatus of Fig. 5 functions as that of Fig. 2.

Figure 6:
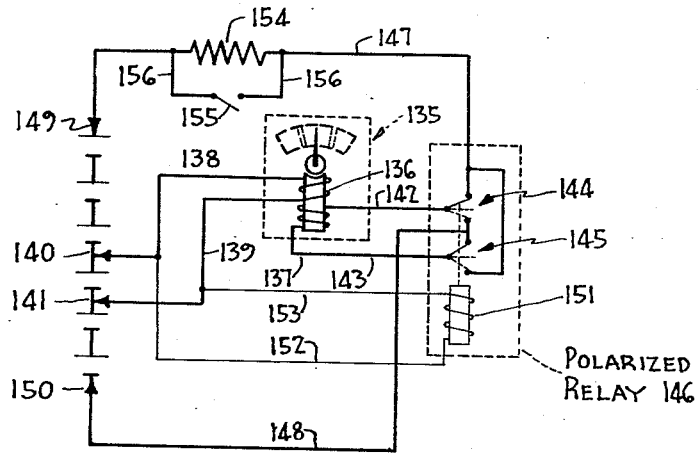
Fig. 6 is a schematic diagram showing an embodiment similar to that of Fig. 4 but wherein a polarized relay is employed to maintain the coils of the differential electromagnetic device in opposition.

In the embodiments of Figs. 1-5, the differential electromagnetic device is made "alive" as soon as one of the coil circuits is connected to the battery. For example, meter 115 of Fig. 5 will read off scale as soon as clamps 120 and 121 are connected and before the prod 126 is connected. While this initial off scale reading is not objectionable in most cases, it can be avoided in the manner shown in Fig. 6.

For purpose of illustration in this embodiment, I have shown an apparatus of the general type previously described with reference to Fig. 4. The apparatus employs a differential voltmeter 135 having coils 136 and 137. The coil 136 is connectable selectively across any desired cell of the battery by conductors 138 and 139 and contact members 140 and 141. The terminals of coil 137 are connected respectively to conductors 142 and 143 leading to the movable contacts of contact sets 144 and 145, respectively, of polarized relay 146. The contact sets 144 and 145, as in the embodiments previously described, are arranged as reversing contacts, so that conductors 142 and 143 may be connected either to conductors 147 and 148, respectively, or to conductors 148 and 147 respectively. Conductor 147 terminates in a battery terminal connector clamp 149, while conductor 148 terminates in a terminal clamp 150. The actuating winding 151 of relay 146 is connected between conductors 138 and 139 by conductors 152 and 153.

Clamps 149 and 150 are marked so as to be visually identifiable as positive and negative clamps, so that the operator will always connect conductor 147 to the positive terminal of the battery and conductor 148 to the negative terminal. With contacts 140 and 141 connected as shown, winding 151 is energized to repel the movable contacts of the relay, so connecting conductor 142 to conductor 147 and conductor 143 to conductor 148. Coils 136 and 137 are thus automatically placed in electromagnetic opposition. Should the connection of contacts 140 and 141 be reversed, the relay 146 reverses contact sets 144 and 145 to maintain coils 136 and 137 in opposition.

As described with reference to the corresponding apparatus of Fig. 4, the circuit components of the present embodiment are so proportioned that the ampere turns of coils 136 and 137 are substantially equal when clamps 149 and 150 are connected to the terminals of a normal battery of a given voltage, and connectors 140 and 141 are connected across a normal cell of that battery. So that the apparatus may be employed to test both 6-volt and 12-volt batteries, a resistance 154 is connected in conductor 147 for 12-volt operation, and is shunted by switch 155 and conductor 156 for 6-volt operation. The resistance 154 and conductor 156 constitute parallel branches of different resistances corresponding to branches 93 and 94, Fig. 4. The components may be proportioned as previously described with reference to that figure. Except for the manner in which relay 146 functions, the apparatus of Fig. 6 operates as described with reference to Fig. 4.

The movable contacts of relay 146 normally occupy a centered position. Thus, when winding 151 is not energized, coil 137 is not connected to the battery. Accordingly, the meter 135 is not actuated off scale when clamps 149 and 150 are connected to the battery and contacts 140 and 141 still disconnected. The meter gives no indication until the apparatus is completely connected, and the needle of the meter then responds to the differential electromagnetic effect of the coils 136 and 137.

As has been stated, the details of construction of the differential voltmeters 1, 85, 115 and 135 form no part of the present invention. The meters may be of the moving magnet or moving coil type. For purposes of simplicity, they have been shown diagrammatically as being of the general type disclosed in Patent 2,446,431 to Pfeffer, such meters including a permanently magnetized disc rotatably mounted and responding to the net electromagnetic effect of the driving coils.

I claim:

1. In a battery cell comparator, the combination of a differential electromagnetic device including two coils, first circuit means including one of said coils and means for connecting the same to the battery to be tested, second circuit means including the other of said coils and manually operable means for selectively connecting the same across any desired cell of the battery, and electromagnetic means responsive to the flow of current in at least one of said circuit means for maintaining said coils in electromagnetic opposition regardless of the manner in which said other coil is connected across a cell of the battery by said manually operable means.

2. In a battery cell comparator, the combination of a differential electromagnetic device including two coils, first circuit means including one of said coils and means for connecting the same to the battery to be tested, second circuit means including the other of said coils and a twin-pronged hand prod for selectively connecting the same across any desired cell of the battery, means including a reversing relay responsive to the flow of current in at least one of said circuit means for automatically placing said coils in electromagnetic opposition regardless of the sense in which said hand prod is connected across a cell of the battery, and indicating means responsive to the difference in electromagnetic effects of said coils.

3. In a battery cell comparator, a differential electromagnetic device including two coils, first circuit means including one of said coils and means for connecting the same to the battery, second circuit means including the other of said coils and a twin-pronged hand prod for connecting said other coil selectively across any desired cell of the battery, a pair of actuating windings each connected in parallel with a different one of said coils, said windings being oriented to oppose each other electromagnetically when said coils are electromagnetically opposed and to aid each other electromagnetically when said coils aid each other electromagnetically, reversing contacts connected in one of said circuit means and arranged to be actuated by the aiding electromagnetic effects of said windings to reverse the connection of the one of said coils in said circuit means, and indicating means responsive to the difference in electromagnetic effects of said coils.

4. In an apparatus for testing a multi-cell storage battery by cell comparison, the combination of two electromagnetic coils, first circuit means including one of said coils and means for connecting the same to the battery to be tested, second circuit means including the other of said coils and means for selectively connecting the same across any desired single cell of the battery, a pair of actuating windings connected each in parallel with a different one of said coils and so oriented as to aid each other electromagnetically when the relative directions of current flow in said circuit means are such that said coils aid each other electromagnetically, contact means connected in one of said circuit means and arranged to be operated by the additive electromagnetic effects of said windings to reverse the connection of the one of said coils included in said one circuit means, and indicating means responsive to the difference in electromagnetic effects of said coils.

5. In a battery cell comparator, the combination of two electromagnetic coils, two twin-pronged hand prods, first circuit means connecting one of said coils across the prongs of one of said prods, second circuit means connecting the other of said coils across the prongs of the other of said prods, whereby said coils may be selectively connected to different cells of a battery to be tested, means including a reversing relay responsive to the flow of current in at least one of said circuit means for maintaining said coils in electromagnetic opposition regardless of the relative sense in which said hand prods are connected to the battery, and indicating means responsive to the difference in electromagnetic effects of said coils.

6. In a battery cell comparator, the combination of two electromagnetic coils, two twin-pronged hand prods, first circuit means connecting one of said coils across the prongs of one of said prods, second circuit means connecting the other of said coils across the prongs of the other of said prods, a relay having two actuating windings each connected in parallel with a different one of said coils and oriented to aid each other electromagnetically when the relative directions of current flow in said circuit means are such that said coils aid each other electromagnetically, the contacts of said relay being connected as reversing contacts in one of said circuit means to reverse the connection of the one of said coils included therein upon actuation of said relay by the additive electromagnetic effects of said windings, and indicating means responsive to the difference in electromagnetic effects of said coils.

7. In a battery cell comparator, the combination of a differential voltmeter, first circuit means including one coil of said voltmeter and a twin-pronged hand prod for connecting said one coil selectively across any desired cell of the battery to be tested, second circuit means including the other coil of said voltmeter and means for connecting the same to the battery, and a double pole double throw relay having two actuating windings each connected in parallel with a different one of said coils, said actuating windings being oriented to aid each other electromagnetically and actuate the relay only when the relative directions of current flow in said circuit means are such that said coils aid each other electromagnetically, and the contacts of said relay being arranged as reversing contacts in one of said circuit means to reverse the connection of the one of said coils included therein upon actuation of the relay by the additive electromagnetic effects of said windings.

8. In a device for testing by cell comparison multicell storage batteries of a given normal voltage, the combination of two electromagnetic coils; a first circuit including one of said coils and means for connecting the same across the entire battery to be tested; a second circuit including the other of said coils and means for selectively connecting the same across any desired cell of the battery, the resistances of said circuits and the numbers of turns of said coils being so proportioned that the effective ampere-turns of said coils are substantially equal when said coils are so connected respectively across an entire normal battery at said given normal voltage and across a single normal cell thereof; means including a reversing relay for maintaining said coils in electromagnetic opposition regardless of the sense in which said other coil is connected to the battery, and indicating means responsive to the difference in electromagnetic effects of said coils.

9. In a device for testing by cell comparison multicell storage batteries of a given normal voltage, the combination of two electromagnetic coils; a first circuit including one of said coils and means for connecting the same across the entire battery to be tested; a second circuit including the other of said coils and means for selectively connecting the same across any desired cell of the battery, the resistances of said circuits and the numbers of turns of said coils being so proportioned that the effective ampere-turns of said coils are substantially equal when said coils are so connected respectively across an entire normal battery at said given normal voltage and across a single normal cell thereof; a reversing relay including two windings each connected in parallel with a different one of said coils, said windings being oriented to aid each other electromagnetically when the relative directions of current flow in said circuits are such that said coils aid each other electromagnetically, the contacts of said relay being connected in one of said circuits and arranged to reverse the connection of the one of said coils included therein upon actuation of said relay by the aiding electromagnetic effects of said windings, and indicating means responsive to the difference in electromagnetic effects of said coils.

10. In a battery cell comparator, the combination of two electromagnetic coils, a twin-pronged hand prod for manual connection across any desired cell of the battery to be tested, a polarized relay, first circuit means including one of said coils and the contacts of said relay for connecting said one coil across the prongs of said hand prod in one polarity sense when said relay is actuated in one direction and in the opposite sense when said relay is actuated in the other direction, second circuit means including the other of said coils and means for connecting the same to the battery in a predetermined polarity sense, the actuating winding of said relay being connected across the prongs of said hand prod and oriented to select by operation of said contacts the connection of said one coil which will place the same in electromagnetic opposition to said other coil when said prod is connected across a cell of the battery, and indicating means responsive to the difference in electromagnetic effects of said coils.

11. In a battery cell comparator, the combination of two electromagnetic coils, first circuit means including one of said coils and a twin-pronged hand prod for selectively connecting said one coil across any desired cell of the battery to be tested, a polarized relay, second circuit means including means for connection to the battery in a predetermined polarity sense, means including the contacts of said relay for connecting said other coil to said second circuit means in one polarity sense when said relay is actuated in one direction and in the opposite polarity sense when said relay is actuated in the other direction, the actuating winding of said relay being connected across the prongs of said hand prod and being oriented to select by operation of said contacts the connection of said other coil which will place said two coils in electromagnetic opposition when said prod is connected across a cell of the battery, and indicating means responsive to the difference in electromagnetic effects of said coils.

12. In combination with a battery charger having charging leads connectable to the terminals of the battery to be charged, a battery cell comparator including a differential electromagnetic device including two coils; first circuit means including one of said coils, an electrical connector for engagement with a cell connecting strap of the battery, and means connecting said one coil between said connector and one of said charging leads, whereby said one coil may be connected across an end cell of the battery as a reference cell; second circuit means including the other of said coils, and a twin-pronged hand prod for selectively connecting said other coil across any desired cell of the battery for comparison of such cell with the reference cell; electromagnetic means associated with said circuit means for maintaining said coils in electromagnetic opposition regardless of the sense in which said hand prod is connected across a cell of the battery, and indicating means responsive to the difference in electromagnetic effects of said coils.

13. In combination with a battery charger having two charging leads each terminating in a clamp for connection to a terminal of a storage battery, a battery cell comparator comprising a differential electromagnetic device including two coils; first circuit means including one of said coils, a connector for engagement with a cell connecting strap of the battery, and means connecting said one coil between one of said charging leads and said connector; second circuit means including the other of said coils and a twin-pronged hand prod for selectively connecting the same across any desired single cell of the battery; two actuating windings connected each in parallel with a different one of said coils and oriented to aid each other electromagnetically when the relative directions of current flow in said circuit means are such that said coils aid each other electromagnetically; reversing contacts connected in one of said circuit means to reverse the connection of the one of said coils therein upon actuation of said relay by the aiding electromagnetic effects of said windings, and indicating means responsive to the difference in electromagnetic effects of said coils.

References Cited in the file of this patent

UNITED STATES PATENTS

| Number | Name | Date |
|---|---|---|
| 2,613,248 | Christie | Oct. 7, 1952 |